March 18, 1958 M. KESSLER 2,827,141

FRAMED PANEL CONSTRUCTION

Filed April 11, 1955

INVENTOR.
Milton Kessler
BY
Attorney

United States Patent Office 2,827,141
Patented Mar. 18, 1958

2,827,141

FRAMED PANEL CONSTRUCTION

Milton Kessler, Youngstown, Ohio

Application April 11, 1955, Serial No. 500,327

5 Claims. (Cl. 189—78)

This invention relates to a framed panel construction, and more specifically to a construction such as may be used for mounting glass panels in a frame.

It is a primary object of the invention to provide a glass sash construction which may be assembled rapidly by unskilled help, without the use of special tools, to provide a tight, efficient sash construction which is sealed against rain and weather.

Another object is the provision of an efficient and inexpensive frame construction and of inexpensive resilient sealing means for sealing and locking a panel, such as a window pane into a frame.

The specific nature of the invention, as well as other objects and advantages thereof, will clearly appear from a description of a preferred embodiment as shown in the accompanying drawings, in which.

Figure 1:
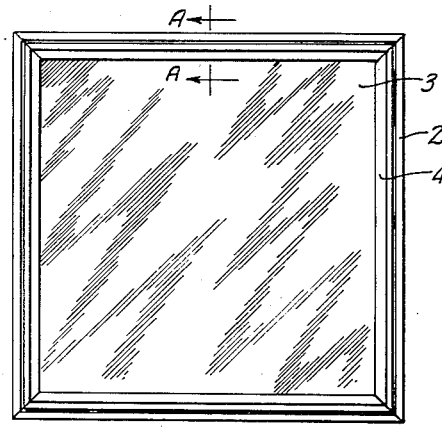
Fig. 1 is a front view of a mounted frame according to the invention.

Fig. 1 shows the general arrangement of the sash according to the invention. The frame 2 is preferably made of extruded metal, usually aluminum, although the invention embraces the use of other frame materials including hard plastic frames. The edge of the frame toward the pane 3 is open to receive a sealing and molding strip 4 of soft extruded plastic molding, e. g., vinyl molding of a generally rubber-like consistency. It will be apparent that any suitable plastic can be used, e. g., rubber, neoprene, etc. One side of the frame 2 extends beyond the other as shown at 6 to form a backing for panel 3; the other side of the frame terminates in an inwardly-directed bead 7 having a barb 8 which is preferably re-entrant, i. e., slanted back to form a true barb-like cross section to engage a corresponding barb 9 or 11 of sealing strip 4.

Figure 2:
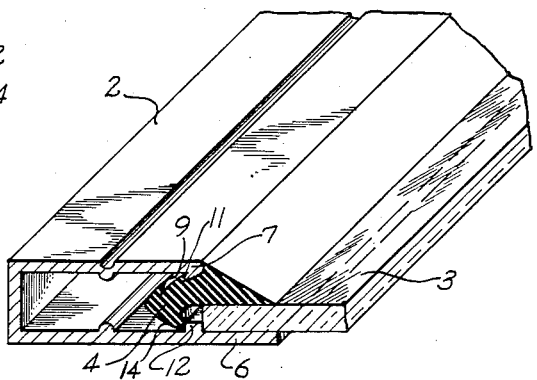
Fig. 2 is an isometric sectional view taken on line *a*—*a* of a portion of the mounted sash, showing the construction.
Figure 3:
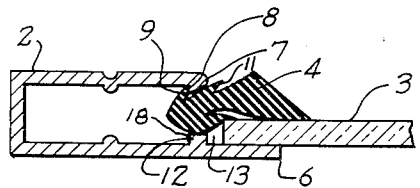
Fig. 3 is a sectional view taken on line *a*—*a* of Fig. 1 showing the resilient sealing member in the initial stage of insertion.
Figure 4:
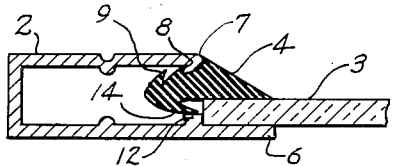
Fig. 4 is a similar sectional view showing the inserted sealing member with the major barb not fully engaged, but with the glass panel engaging the stop bead.

Directly opposite bead 7 and even therewith is a stop bead 12, so that if the pane 3 is cut so large that it just fits into the frame, the stop bead 12 will engage the edge of the panel as best shown in Figs. 2 and 4 to prevent the glass from sliding into the channel formed by the inner edge of the frame between bead 7 and side 6. In the usual case, the glass is cut a little small so that there will be a space at least on two adjacent edges of the glass as shown at 13 in Fig. 3, even if the other two edges snugly abut their stop beads 12.

Figure 5:
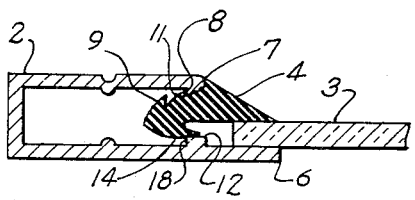
Fig. 5 is a view similar to Fig. 4 in the situation where the glass panel does not fully extend to the stop bead.
Figure 6:
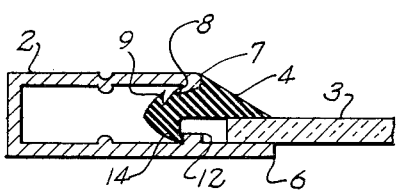
Fig. 6 shows the fully inserted sealing member in the ideal condition.

To retain the glass in place and also to seal it against rain and weather, strip 4 is inserted as best shown in Fig. 3. This strip is provided with barbs 9 and 11 in the form of ridges extending axially along the strip on one side thereof, and a larger barb 14 on the other side. Barb 14 folds flat during insertion of the strip as shown in Fig. 3, but when the strip is pressed home and barb 14 clears the edge of pane 3, it expands behind stop bead 12 to securely lock the sealing strip in place, as shown in Fig. 6. If due to careless insertion or to differences in dimensional tolerance, barb 14 does not clear stop bead 12, no great harm is done, as barb 14 then engages the top of bead 12 as shown in Figs. 4 and 5, and presses barb 11 on the opposite side into firm locking engagement with the re-entrant back edge of bead 7. Thus there is a constant pressure of the bulk of strip 4 firmly locking the strip in place. This is of great practical importance since other locking strips have been made which rely only on the natural bending or flexing of the material to hold the strip in place. As the material has a slight tendency to take a permanent set under stress, locking action soon disappears if the strip is not firmly supported and the strip no longer performs its function efficiently. In the present construction the bulk of the material is primarily relied on to hold the barb in locking engagement, and the resistance to flexing of the material is not relied on.

During initial insertion, the forward barb 11 is useful in holding the strip in the position shown in Fig. 3 while other portions of the strip are pressed into place, otherwise, there may be a tendency for the partially inserted strip to work its way out again. Also, in cases of very poorly fitting frame construction, barb 9 may remain the sole holding point against removal of the sealing strip.

If the barb 14 almost but not quite clears stop bead 12, it will assume the position shown in Figs. 4 and 5. Fig. 4 shows the case where the edge of the glass pane rests substantially against the stop bead 12, while Fig. 5 shows the case where the edge of the glass pane is spaced from the bead, as will usually occur on one side due to cutting the glass sufficiently small to insure its insertion into the frame. In this case the tendency of the barb to expand will cause it to extend beyond corner 17 of bead 12, so that there will still be a very effective locking action on both sides of the strip; in the worst possible case, there will be a locking action on barb 11, but with maximum effect of the bulk of the strip cross section holding barb 11 in place due to the pressure of the corner 17 of bead 12 against barb 14.

In the event that the plastic strip 4 does not enter behind stop bead 12, but rests upon it, barb 14 will in any case clear the glass pane 3, and lock behind the edge of the pane as best shown in Fig. 4, thus further locking the strip against withdrawal, and allowing additional tolerance in both the plastic and the metal. In practice, with reasonably well-cut glass, the gap will seldom be as great as shown in Fig. 5, and it will be noted that even with partial insertion as shown in Fig. 3, an effective, although not attractive, seal is provided.

Edge 18 of stop bead 12 is also preferably sloped back to form a barb as shown, to improve the locking action, although this is not essential, since any reasonable backside slope will hold quite well, and even a rounded bead at 12 is reasonably effective. However, the re-entrant or back slope construction is preferred as it gives the most effective locking action.

Where the pane fits snugly against stop bead 12, as in Fig. 4, the full cross section of the strip is subjected to a distributed shear force resisting outward movement of the pane. Where the pane edge is spaced from the stop 12, as in Fig. 5, very nearly the same cross section is effective to restrain the pane if the turning moment on the strip is opposed, as it is by the action of barb 14. If this element were not present, outward force on the pane would merely rotate the strip and the pane would come out, or at least become loose in its frame. Thus the full thickness of the sealing strip is used to lock or wedge the pane in place, yet the construction is such that the strip can be inserted without requiring too much force, which makes for rapid assembly, and can be pulled out if necessary, without damaging the strip, even though considerable force is required, so that the strip can be reused.

It will be apparent that the embodiments shown are only exemplary and that various modifications can be made in construction and arrangement within the scope of my invention as defined in the appended claims.

I claim:

1. In combination, a frame comprising a channel member having one side longer than the other, a panel in said frame supported at its outer edge by the longer side of said channel member, a stop bead on said longer side engaging the edge of said panel inwardly from the edge of said longer side, the shorter leg of said channel member defining an opening to receive said panel, and a wedge strip composed entirely of extruded resilient material between said panel and said shorter side to hold said panel in the frame, said shorter side having an inwardly-projecting bead, said strip having at least one axially-extending flexible barbed ridge on one side thereof to engage said last bead and a second axially-extending flexible barbed ridge on the opposite side to engage said stop bead to oppose withdrawal of said strip, said barbed ridges pressing on opposite interior faces of said channel, said second barbed ridge being sufficiently larger than the first barbed ridge to engage a portion of the longer side of the channel when driven home, to insure pressure of the first barb against the first bead in any position of the engaged strip.

2. The invention according to claim 1, there being a second barb on said one side of said strip ahead of said first barb to insure engagement of said inwardly projecting bead with at least one of said barbs.

3. The invention according to claim 2, said second barb being sufficiently thin to lie substantially flat while the strip is being driven home so as to enter the narrowest portion of said channel.

4. A window panel comprising a frame having a front side constituting an opening, a panel in said opening of smaller size than the opening, said frame having a back side with an opening of smaller size than the panel to support the panel, said front and back side being spaced from each other, a stop bead running axially of said frame on the inner back side of said frame and extending toward the front side of the frame no further than the thickness of the panel to retain the edges of the panel, a bead extending from the inner edge of the front side of said frame toward said stop bead to define a narrow path between said beads, and a wedge strip composed entirely of extruded resilient material between said panel and said front side, said strip having an axially-extending double-barbed point extending into said passage with the oppositely-facing barbs thereof respectively engaging said beads to prevent withdrawal of said strip, said barbs being flexible toward and away from the body of the strip, the barb on the glass side of the strip being sufficiently larger than the other barb to engage a portion of the frame in any locking position of the strip.

5. The invention according to claim 4, said larger barb being sufficiently thin to lie flat while the strip is being driven home so as to readily enter the narrow passage between said beads.

References Cited in the file of this patent

UNITED STATES PATENTS

| | | |
|---|---|---|
| 1,892,104 | Hunter | Dec. 27, 1932 |
| 2,248,297 | Chaffee | July 8, 1941 |